(12) United States Patent
Hallot

(10) Patent No.: US 12,270,493 B2
(45) Date of Patent: Apr. 8, 2025

(54) METHOD FOR PRODUCING A STEEL UNDERWATER PIPE THAT IS ABLE TO CARRY A CORROSIVE FLUID

(71) Applicant: SAIPEM S.A., Montigny le Bretonneux (FR)

(72) Inventor: Raymond Hallot, Voisins le Bretonneux (FR)

(73) Assignee: SAIPEM S.A., Montigny le Bretonneu (FR)

( * ) Notice: Subject to any disclaimer, the term of this patent is extended or adjusted under 35 U.S.C. 154(b) by 0 days.

(21) Appl. No.: 18/602,757

(22) Filed: Mar. 12, 2024

(65) Prior Publication Data
US 2024/0255076 A1    Aug. 1, 2024

Related U.S. Application Data

(62) Division of application No. 17/274,572, filed as application No. PCT/FR2019/052066 on Sep. 9, 2019, now Pat. No. 12,123,522.

(30) Foreign Application Priority Data

Sep. 10, 2018    (FR) ..................... 18 58090

(51) Int. Cl.
    *F16L 13/02* (2006.01)
    *B23K 31/02* (2006.01)
    (Continued)

(52) U.S. Cl.
    CPC ........ *F16L 13/0263* (2013.01); *B23K 31/027* (2013.01); *F16L 58/1009* (2013.01);
    (Continued)

(58) Field of Classification Search
    None
    See application file for complete search history.

(56) References Cited

U.S. PATENT DOCUMENTS

| 4,611,833 A | 9/1986 | Lescaut |
| 5,992,897 A | 11/1999 | Hill et al. |

(Continued)

FOREIGN PATENT DOCUMENTS

| FR | 2564938 A1 | 11/1985 |
| WO | 2004015321 A1 | 2/2004 |

(Continued)

OTHER PUBLICATIONS

Search Report from corresponding French Application No. FR1858090, Mar. 22, 2019.

(Continued)

*Primary Examiner* — Devang R Patel
(74) *Attorney, Agent, or Firm* — Workman Nydegger

(57) ABSTRACT

A method for producing a steel underwater pipe for carrying a corrosive fluid, includes the successive steps: applying a layer of corrosion-resistant steel alloy on a terminal part of the internal wall of each pipe element from its end to be welded; the application of a plastic coating, on the internal wall of each pipe element; covering only a first part of the layer of metal alloy, a terminal part of the layer of metal ally on the side of the end to be welded of each pipe element not being covered by the plastic coating; the coaxial insertion and the crimping of a compression ring against the terminal part of the plastic coating; and the assembly by welding directly together the ends of two pipe elements by a corrosion-resistant steel alloy weld.

6 Claims, 6 Drawing Sheets

(51) Int. Cl.
  *F16L 1/16* (2006.01)
  *F16L 58/10* (2006.01)
  *B23K 101/10* (2006.01)
  *B23K 103/16* (2006.01)
  *F16L 1/26* (2006.01)

(52) U.S. Cl.
  CPC .... *B23K 2101/10* (2018.08); *B23K 2103/172* (2018.08); *F16L 1/161* (2013.01); *F16L 1/26* (2013.01); *F16L 58/1018* (2013.01)

(56) References Cited

U.S. PATENT DOCUMENTS

| | | | |
|---|---|---|---|
| 7,722,085 | B2 | 5/2010 | Pionetti |
| 8,366,351 | B2 | 2/2013 | Rocher |
| 8,714,597 | B2 | 5/2014 | Venable et al. |
| 8,942,552 | B2 | 1/2015 | Pionetti et al. |
| 10,648,607 | B2 | 5/2020 | Carlucci et al. |
| 2005/0246883 | A1* | 11/2005 | Alliot .............. F16L 13/0263 29/715 |
| 2007/0284872 | A1* | 12/2007 | Pionetti .......... F16L 13/0263 285/55 |
| 2009/0129853 | A1* | 5/2009 | Pionetti .............. B05D 7/222 427/234 |
| 2010/0028085 | A1 | 2/2010 | Rocher |
| 2013/0114945 | A1 | 5/2013 | Pionetti et al. |
| 2018/0119850 | A1 | 5/2018 | Barnes |
| 2019/0178424 | A1* | 6/2019 | Sidgman Saitua ... F16L 58/181 |
| 2020/0041062 | A1 | 2/2020 | Carlucci et al. |
| 2020/0316876 | A1* | 10/2020 | Fatica .............. B29C 66/53241 |

FOREIGN PATENT DOCUMENTS

| | | |
|---|---|---|
| WO | 2006042925 A1 | 4/2006 |
| WO | 2008037907 A1 | 4/2008 |
| WO | 2012017171 A1 | 2/2012 |
| WO | 2017098327 A1 | 6/2017 |
| WO | 2018172643 A1 | 9/2018 |

OTHER PUBLICATIONS

International Search Report and Written Opinion from PCT Application No. PCT/FR2019/052066, Jan. 17, 2020.

* cited by examiner

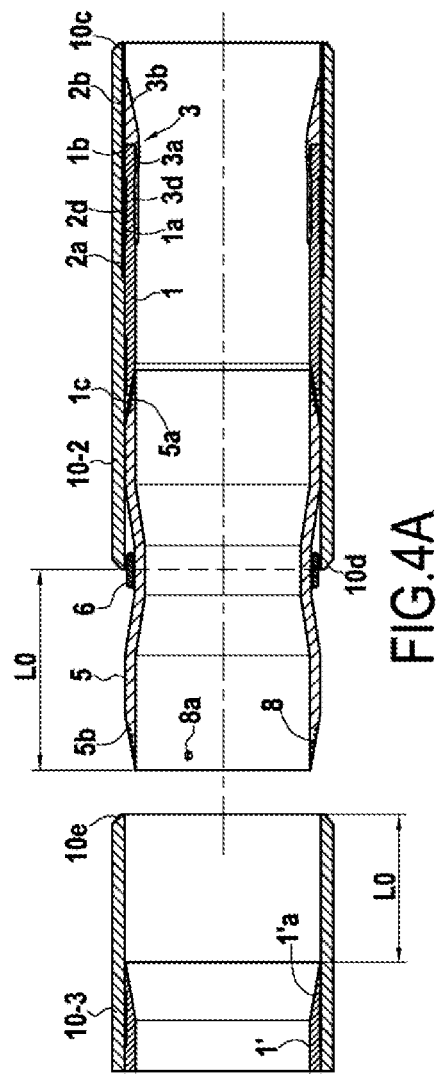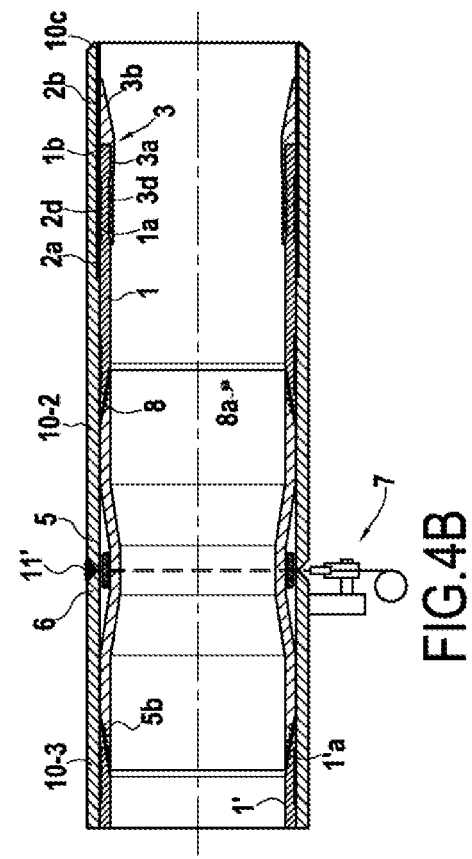

METHOD FOR PRODUCING A STEEL UNDERWATER PIPE THAT IS ABLE TO CARRY A CORROSIVE FLUID

BACKGROUND OF THE INVENTION

The present invention relates to the general field of pipes for transporting corrosive fluids, particularly underwater pipes resting on the bottom of the ocean or providing the bottom-to-surface connection for the transfer of water or hydrocarbons, for example petroleum and gas, originating in underwater production wells.

These pipes are produced by end-to-end welding of the ends of pipe elements which can be unitary pipe elements or the ends of strings each consisting of a plurality of unitary pipe elements as described in WO 2008/037907 in the applicant's name.

The steels constituting the pipes and the welds between pipe elements can be subject to corrosion when said pipe carries a corrosive liquid which can in particular be water or a fluid including water and more particularly salt water.

To mitigate this problem, welds are produced, by means of a corrosion-resistant steel alloy, between the pipe elements, previously coated over a few cm at the ends of the pipe elements to be welded together with a corrosion-resistant steel alloy, identical or different but having equivalent properties, so that the back bead of the weld which will constitute the future wall in contact with the fluid is of the same metal as or equivalent to the filler metal of the weld, in particular to Inconel. This coating of anti-corrosion steel alloy, particularly of the Inconel type, can be achieved by the weld overlay technique generally performed by means of a TIG electric arc welding method associated with a stainless steel or corrosion resistant alloy filler wire as described in PCT/FR2018/050429 in the applicant's name, or by a plasma torch method or by a GMAW welding method or by an SAW flux arc welding method (wire or strip) or by placing strips by Joule-effect welding according to the technique called "electroslag," with an electrically conductive flux.

Anti-corrosion alloys are well known to a person skilled in the art; these are mainly nickel-based alloys, preferably of a particular grade, particularly Inconel 625 or Incoloy 825.

Furthermore, methods are known for protection against corrosion by continuous plastic lining of the internal steel surface of the pipe, by means of a flexible coating of thermoplastic materials, particularly of high-density polyethylene, also called "liner." But the ends of the pipe elements to be assembled by welding must not be precoated with said liner of plastic material because it will not tolerate the high temperatures used during the welding operations.

In addition, these plastic linings of the liner type require in particular an anchorage to the ends by means of ferrules, rings or tubular sleeves so that the lining can hold in place, particularly in case of variation in temperature.

In WO 2006/042925, WO 2012/017171, WO 2017/098327 and US 2018/0119850, among others, the continuity of the protective coating of plastic material in the form of thermoplastic liner and the ends of the two pipe elements to be welded not coated by said liner is provided for by using a tubular junction sleeve of anti-corrosion material, particularly of plastic between the unlined ends of the two pipe elements to be assembled, which sleeve overlaps in a sealed manner the ends of the two thermoplastic coatings inside the pipe and in line with the weld to be produced. This type of solution allows avoiding the production of a lining of anti-corrosion steel alloy and/or of a weld of anti-corrosion steel alloy, but these tubular junction sleeves are complex, however, and costly to set up.

In U.S. Pat. Nos. 5,992,897 and 8,714,597, a complex system is proposed which requires using a connecting piece of carbon steel coated with a lining of anticorrosion steel alloy in U.S. Pat. No. 5,992,897 or a connecting piece of anti-corrosion steel alloy in U.S. Pat. No. 8,714,597, at the end of each pipe element, and to assemble together by a weld of anti-corrosion steel alloy the ends of the two connecting pieces. This necessitates 3 welds in all, namely a weld of anti-corrosion steel alley between two connecting parts end to end, and two welds of ordinary carbon steel between the ends of the pipe elements and respectively the two ends of the connecting piece. On the other hand, this necessitates setting up the plastic coating in the pipe elements and on a part of the connecting part only after having produced the carbon steel welds, the other part of the internal wall of the connecting piece not being lined by a plastic coating to allow welding between the two connecting pieces.

In U.S. Pat. No. 5,992,897, as shown in FIGS. 1A and 1B, connecting pieces 12 of carbon steel are used, coated with an internal lining of anti-corrosion steel 18, and the junction between the liner 30 and the internal wall of the connecting part 12 is secured in terms of sealing by compression rings 32 of anti-corrosion steel on the one hand, and a sleeve 40 of plastic material on the other hand, which ensures the junction without overlap between the two ends of the plastic coatings at the unlined ends of the two connecting parts.

In U.S. Pat. No. 8,714,597, in FIGS. 1, 3 and 6C, the connecting pieces 5 are of anti-corrosion steel alloy and the junction between the liner 13 and the internal wall of the connecting piece 5 is secured in terms of sealing by compression rings of anti-corrosion steel 9 which overlap the ends of the liner 13.

The object of the present invention is to supply a method of assembly by welding of underwater pipe elements based on a pipelay vessel at sea or on the shore, which is:
  reliable in terms of sealing at the transition between the coated section of a lining and the section coated with corrosion-resistant steel alloy (i.e. water will not infiltrate under the lining), and
  reliable in terms of resistance to corrosion at the welds and particularly not having any risk of cell effect in the interior of the pipe during operation, and
  reliable in terms of resistance to fatigue at each of the welds, and
  affecting as little as possible the mechanical resistance performance and/or increasing as little as possible the head losses of fluid carried inside the pipe in operation, and
  simple and least costly possible to use, and particularly in which the step of assembly and in particular welding is carried out as little as possible on board the pipelay vessel.

More particularly, the object of the present invention is to supply a method of assembly by welding of underwater pipe elements coated with a thermoplastic lining without using a tubular junction sleeve of anti-corrosion material or a connecting piece of steel, and which require only a single weld of anti-corrosion steel alloy instead of two of carbon steel and one of steel alloy as is the case with the steel connection pieces as described above.

Object and Summary

To this end, the present invention supplies a method for producing a steel underwater pipe that is able to carry a corrosive fluid, particularly water, the internal wall of which is partially lined by a protective coating of plastic material of the liner type, in which the assembly by welding directly together the ends of at least two pipe elements is provided for, comprising steps in which are produced successively:

a) the application, preferably by welding, of a layer of corrosion-resistant steel alloy on a terminal part of length L1 of the internal wall of each pipe element from its end to be welded;

b) the machining on the pressure side surface of the layer of corrosion-resistant steel alloy, c) the application of a said protective coating of plastic material, preferably in the form of a tubular shell, directly on the internal wall of each pipe element; and covering a first part of length L2 of said layer of corrosion-resistant steel alloy, a second, adjacent part of length L3 of said layer of corrosion-resistant steel alloy on the side of the end to be welded of each pipe element not being covered by said protective coating of plastic material, d) the coaxial (XX') insertion of a compression ring of corrosion-resistant steel alloy inside said terminal part of each pipe element and the crimping of a first annular part of length L4 of said compression ring against the pressure side face of the terminal part of said protective coating of plastic material covering a first part of said layer of corrosion-resistant steel alloy, and the welding of the free end of a second annular part of said compression ring against a second part of said layer of corrosion-resistant steel alloy not covered by said protective coating of plastic material, said first annular part of the compression ring comprising an outer side face which is corrugated, over a part at least of its length, preferably in the form of a plurality of first parallel circular peripheral grooves, said second annular part of said compression ring continuing said first annular part, said second annular part of the compression ring being applied against a part of said second part of the layer of corrosion-resistant steel alloy not covered by said coating of plastic material and extending over a length L5 less than L3, from and against the end of said coating of plastic material until said free end of said compression ring closest to the end to be welded of the pipe element, and e) the assembly by welding directly together the ends to be welded of two pipe elements by a corrosion-resistant steel alloy weld.

It is understood that said first and second parts of the layer of steel alloy, on the one hand, and on the other hand said first and second annular part of the compression ring, are respectively two contiguous parts in the longitudinal direction of the pipe element.

The method according to the invention is advantageous, in that it allows assembling directly together the pipe elements to be welded with a peripheral weld of anti-corrosion steel and to ensure the protection against corrosion of the internal wall of the pipe transporting a corrosive fluid with a protective coating of plastic material (thermoplastic liner) on the current part of the pipe elements and a coating of anti-corrosion steel at the ends to be welded end-to-end of the two pipe elements, and this without using a tubular junction sleeve providing for the junction between the two liners of the two pipe elements, on the one hand, and/or without interspersing a steel connecting piece of smaller dimension than said pipe element to be welded between the two pipe elements, on the other hand. Thus, it is easy to prepare the pipe elements on shore and produce the assembly by welding of step e) at sea on the pipelay vessel.

Said crimped first part of the compression ring ensures, on the one hand, the protection and the isolation of the terminal part of the liner type plastic coating during said welding of the ends of the pipe elements and ensures, on the other hand, the reliability of the sealing, avoiding any delamination of the plastic coating or liner and penetration of the fluid between the plastic coating and the internal wall of steel of the pipe. And, the second annular part of the compression ring contributes to the isolation of the terminal part of the plastic coating and the sealing between the plastic coating and the steel wall of the pipe. The welding of the end of the second annular part of the compression ring against the second part of said layer of corrosion-resistant steel alloy not covered by said protective coating of plastic material has a double purpose, that of reinforcing the longitudinal anchorage of the ring in the pipe but also, as it is continuous and sealed, to reinforce the sealing of the first part of the crimped compression ring. In effect, this continuous and sealed weld prevents any leak at the end of the ring. Thus, the system consisting of the ring and of the plastic coating includes a double sealing barrier.

Preferably, said compression ring comprises a said second annular part, the pressure side surface of which is of conical shape, connecting the pressure side surface of the first annular part and the surface of the second part of the layer of corrosion-resistant steel alloy not covered by said coating of plastic material, at the end of said second annular part of the compression ring closest to the end of the pipe element.

What is meant here by "second annular part, the pressure side surface of which is of conical shape," is a shape of said second annular part with a longitudinal section in substantially the shape of a right triangle, the right angle of which abuts on the edge of the end of said plastic coating or liner and the hypotenuse constitutes a said inclined pressure side surface of the second annular part. This conical shape thus creates a progressive variation of the inner diameter of the pipe at the transition between the terminal part of the layer of anti-corrosion alloy not lined by the coating of plastic material and the terminal part of the coating of plastic material having excess thickness relative to the second terminal part of the layer of anti-corrosion alloy not lined by the liner, for the purpose of limiting the singular head losses, offering a progressive passage without a sharp edge to the scraping pistons, and finally to limit the risk of erosion for the transport of fluid at high flow speed or when said fluid contains abrasive particles.

Also advantageously, said second annular part of the compression ring, preferably of conical shape, extends against said terminal part of the layer of corrosion-resistant alloy steel over a length L5 of approximately ½ of L3, the length of the terminal part of the layer of corrosion-resistant steel alloy not covered by said coating of plastic material.

Preferably in step b), machining is carried out so as to create a corrugation, still preferably in the form of a plurality of second parallel circular peripheral grooves on the first part of the pressure side face of the layer of corrosion-resistant steel alloy intended to be covered by a terminal part of said protective coating of plastic material.

More particularly still, in step c), the end of said protective coating of plastic material is terminated at a distance L3 from the end to be welded of each pipe element, L3 being at least equal to ⅓, preferably at least ½ of the length L1 of said layer of corrosion-resistant steel alloy. This allows sufficient separation of said protective coating of plastic material from the welding site at the end of the pipe element.

More particularly still, in step a), the layer of corrosion-resistant steel alloy on the terminal part of the internal wall of each pipe element extends over a length L1 of ½ to 2 times the inner diameter D1 of the pipe element prior to machining and/or of 4 to 20 times the thickness of the pipe element prior to machining, L1 preferably being substantially equal to D1.

More particularly still, in step d), said compression ring comprises at least one first annular part, the outer side face of which is corrugated over a length d3, preferably substantially equal to and facing a length d2 of the corrugated part of the first part of the layer of corrosion-resistant steel alloy, said first and second parallel circular peripheral grooves having a depth of 1 to 1.5 mm and extending over a length of ⅕ to ½ of L1, preferably of ¼ to ⅓ of L1 and with a distance of 4 to 6 mm between said first circular grooves and respectively between said second circular grooves.

More particularly still, prior to step a), prior machining is carried out of the bore of said terminal part of length L1 of the internal wall of each pipe element, over a depth intended to receive said layer of corrosion-resistant steel alloy of 1 to 5 mm, preferably 3 mm, and in step b) machining is carried out on the pressure side surface of the layer of corrosion-resistant steel alloy at the inner diameter of the pipe before said prior machining.

More particularly still, prior to step e), finish machining is also carried out of the end of the pipe to form a chamfer allowing receiving a weld bead during step e) of end-to-end assembly by welding.

More particularly, the layer of corrosion-resistant steel alloy, said compression ring and said welds of corrosion-resistant steel alloy are mad of the same anti-corrosion steel alloy, particularly of Inconel 625®.

More particularly, the pipe is produced of carbon steel hand has an inner diameter D1 of 150 to 750 mm, a thickness e of 5 to 75 mm.

More particularly still, steps are carried out in which:
1) pipe elements are prepared for welding together by carrying out steps a) to d) above, and
2) step e) of assembly by welding with a corrosion-resistant steel alloy of the respective ends to be welded of at least 2 pipe elements obtained according to step 1) above is carried out, preferably at sea from a pipelay vessel.

More particularly still, the steps are carried out in which:
1) the pipe elements to be welded together are prepared by carrying out steps a) to d) in an onshore workshop, and
2) step e) of assembly by welding the respective ends of at least 2 pipe elements is carried out at sea from a pipelay vessel.

The present invention also supplies a pipe element obtained in step 1) and useful in step 2) above of the method of the invention, said pipe element comprising:
a layer of corrosion-resistant steel alloy on a terminal part of length L1 of the internal wall of said pipe element from one end to be welded;
a protective coating of plastic material, preferably in the form of a tubular shell, applied directly on the internal wall of said pipe element; and covering a first part of length L2 of said layer of corrosion-resistant steel alloy, a second part of length L3 of said layer of corrosion-resistant steel alloy on the side of the end to be welded of said pipe element not being covered by said protective coating of plastic material,
a compression ring of corrosion-resistant steel alloy inserted inside the pipe element, comprising:

(a) a first annular part of length L4 comprising an outer side face which is corrugated, over a part at least of its length L4, preferably in the form of a plurality of first parallel circular peripheral grooves, said first annular part being crimped against the pressure side face of at least a terminal part of said protective coating of plastic material covering said first part of said layer of corrosion-resistant steel alloy, and (b) a second annular part of length L5 less than L3, continuing said first annular part, applied against a part of said second part of the layer of corrosion-resistant steel alloy not covered by said coating of plastic material, said second annular part of said compression ring extending from and against said end of said coating of plastic material until said free end of said compression ring closest to the end to be welded of the pipe element, welded against said second part of said layer of corrosion-resistant steel alloy not covered by said protective coating of plastic material.

More particularly, said pipe element comprises:
a first part of the pressure side face of the layer of corrosion-resistant steel alloy intended to be covered by a terminal part of said protective coating of plastic material is machined for corrugation, in part at least, preferably in the form of a plurality of said second parallel circular peripheral grooves, and
said compression ring comprises at least:
(a) one first annular part, the outer side face of which is corrugated in part at least, preferably in the form of a plurality of said first parallel circular peripheral grooves, able to cover said terminal part of said protective coating of plastic material, in line with at least the corrugated part of the first part of the layer of corrosion-resistant steel alloy of which the pressure side face is covered by the terminal part of said protective coating of plastic material, said first annular part extending in line with the second part of the layer of corrosion-resistant steel alloy not covered by said coating of plastic material, and
(b) one said second annular part the pressure side surface of which is of conical shape connecting the pressure side surface of the first annular part and the surface of the second part of the layer of corrosion-resistant steel alloy not covered by said coating of plastic material, at the end of said second annular part of the compression ring welded against said second part of said layer of corrosion-resistant steel alloy not covered by said protective coating of plastic material.

The present invention also supplies a hybrid pipe element according to the invention in which the other end of said hybrid pipe element which is not intended to be welded in said step 2) does not comprise said compression ring but comprises a rigid tubular junction sleeve of thermoplastic material, a first longitudinal end of said sleeve being in sealed contact or being formed in a continuous piece with the other end of said coating of plastic material inside said hybrid pipe element, a second end of said sleeve protruding by a length L0 outside the other end of said hybrid pipe element.

More particularly, said second end of said sleeve protruding outside the other end of said hybrid pipe element is inserted inside another pipe element in sealed contact, preferably by electric socket welding, with the end of a coating of plastic material set back by a length L0 inside another pipe element relative to the end of said other pipe element assembled by steel alloy welding with said hybrid pipe element.

The present invention also supplies a steel underwater pipe that is able to carry a corrosive fluid, particularly water, of which the internal wall is partially lined by a protective coating of plastic material of the liner type, in which the assembly by welding directly together said ends to be welded of at least two pipe elements according to the invention, each comprising a said compression ring on the side of said end to be welded, is provided for.

Preferably, said metallic coat of anti-corrosion alloy is deposited by welding in several layers as described in patent application FR 1752255 in the applicant's name.

In another version, the method of coating with an anti-corrosion alloy by placing strips by Joule-effect welding of an anti-corrosion steel alloy known to a person skilled in the art under the name of electroslag. This method uses a strip of 20 to 50 mm width and 0.5 to 1 mm thickness which is melted, the energy necessary for melting the strip and the base metal of the pipe being supplied by Joule effect and not by an electric arc, which radically minimizes the perturbation of the interface between the base steel of the pipe and the stainless steel or anti-corrosion alloy.

By proceeding in this manner, the plasma or the metal melted by electroslag creates a much more regular fusion zone on the active surface than a TIG torch associated with a filler wire, facilitating the use of ultrasound techniques to carry out the monitoring of the weld.

Preferably, the surface of the steel pipe on which the anti-corrosion steel alloy is deposited should have a cylindrical geometry of circular and uniform cross section at the end of the process.

Thus, the bore of the pipe element is machined first of all with high accuracy over said first length, for example approximately 150 mm, then said layer of corrosion-resistant steel alloy is applied, which is then machined to the nominal inner diameter of the pipe to obtain accurate cylindricity.

In one embodiment, the method of coating the layer of corrosion-resistant steel alloy comprises more precisely:
  the boring of the internal surface to a certain depth until a bright finish is obtained, and the deposition of the anti-corrosion steel alloy to a depth greater than said depth of the bore, then the reboring of the surface of said deposit of said anti-corrosion steel alloy to level its surface to the same level as the adjacent surface of carbon steel not covered by said stainless steel or corrosion-resistant steel alloy.

The initial boring allows the internal surface of the pipe on which is deposited the corrosion-resistant steel alloy to have a surface condition of very high quality so that the interface between the two qualities of steel or alloy: carbon steel base and deposited corrosion-resistant steel alloy is substantially cylindrical and with a substantially circular cross section. On the other hand, a uniform weld overlay of high accuracy allows accomplishing the monitoring of the weld by accurate and reliable ultrasonic tests.

Optionally, the application of the coating of plastic material comprises a step of bonding the external surface of said tubular shaped shells outside the pipe prior to application to the internal surface of the pipe.

Also optionally, said external surfaces of the shells are previously treated with a jet of cold air plasma prior to bonding.

For the application of the coating of plastic material, a currently employed method designated "Swagelining," which consists of pulling a tubular shell or plastic pipe through a die for reducing its diameter inside the pipe intended to be lined with plastic.

In another embodiment, said shells are introduced in the folded form inside the strip, optionally after bonding, then returned to the tubular shape by radial expansion and pressing the outer surface of each shell against the inner surface of the pipe, preferably by inflation under pressure or pressurization by means of a cylindrical balloon with a length greater than the length of said shell, previously introduced inside said shell.

More particularly, said shells after boding are folded longitudinally so as to have in cross section a contour in the shape of a string bean, then introduced by means of a carriage into the pipe in which they are returned to the tubular shape to be pressed against the inner surface of the pipe.

More particularly still, the inner surface of said pipe elements is treated by sandblasting at the zones of said lining by plastic coating, before applying said lining by plastic coating.

In known fashion, said tubular shells are produced of plastic material selected among the polyurethanes, epoxy, rubber, polypropylene, polyethylene and polyamide, fluoroelastomer, polyvinylidene fluoride (PVDF) and silicone. Preferably, a plastic coating of high-density polyethylene (PEHD) is used.

The present invention also supplies underwater pipes for bottom-to-surface connections, of which at least a part is obtained by a method according to the invention.

More particularly, underwater pipes for bottom-to-surface connection according to the invention are catenary pipes of the SCR (steel catenary riser) type extending in a configuration in the form of a catenary and of which at least a part comprising the zone in contact with the ground extend over at least 100 m, preferably 200 m above the ground, has been assembled by a method according to the invention.

The different lengths d2, d3 and L1 to L5 are understood to be dimensions in the longitudinal direction XX' of the pipe elements. It is understood that L1=L2+L3, d2 is less than L4, L4 is less than L2 and L5 is less than L3.

What is meant here by "thickness of the pipe" and "inner diameter D1 of the pipe" are the thickness and the diameter of the current part of carbon steel of the pipe elements not coated with said coatings of plastic material and said metallic layers of anti-corrosion alloy.

BRIEF DESCRIPTION OF THE DRAWINGS

Other features and advantages of the present invention will be revealed by the description given below, with reference to the appended drawings which illustrate examples of it without any limiting character. In these figures:

FIGS. 4A-4C illustrate a variant embodiment involving the use of a hybrid pipe element equipped with a tubular junction sleeve 5.

DETAILED DESCRIPTION OF THE INVENTION

Figure 1A:
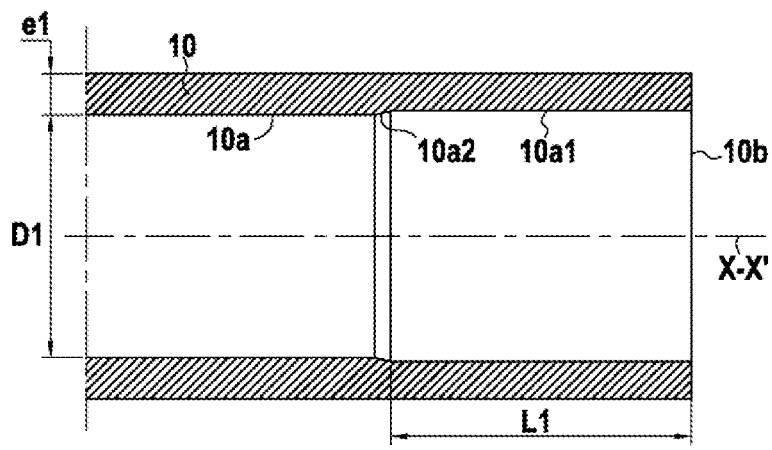
FIGS. 1A to 1F illustrate different steps of an exemplary embodiment of a pipe element 10, 10-1 and 10-2 for use in the method according to the invention.

In FIG. 1A, a pipe element 10 is shown in which the bore of a terminal part 10a1 of the internal wall 10a has been machined to a depth of 1 to 5 mm, preferably 3 mm, extending from the end to be welded 10*b* of the pipe element over a length L1 of ½ to 2 times the inner diameter D1 of the pipe element prior to machining, or of 4 to 20 times the thickness e of the pipe element prior to machining, and terminating with an inner chamfer 10*a*2. Preferably, L1 is equal to the inner diameter D1 of the pipe element prior to machining. In practice, the inner diameter D1 is 150 to 750 mm and the thickness is then respectively 5 to 75 mm.

Figure 1B:
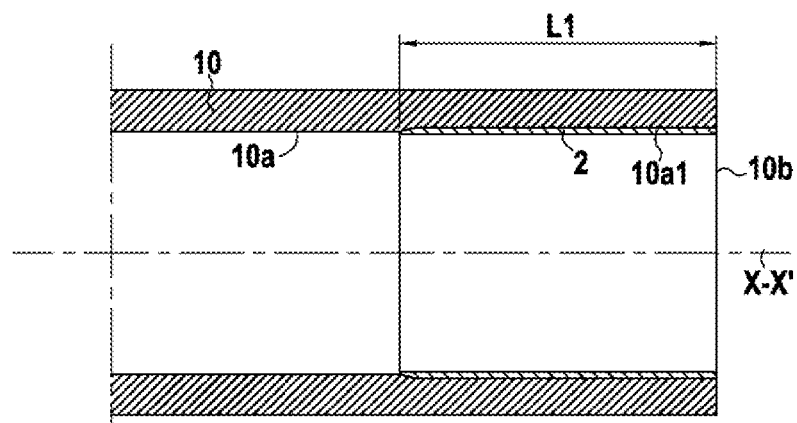

In FIG. 1B, the terminal part 10*a*1 of the internal wall 10*a* of the pipe element 10 is coated with a weld overlay 2 of alloy steel resisting the corrosion of the fluid to be transported.

Figure 1C:
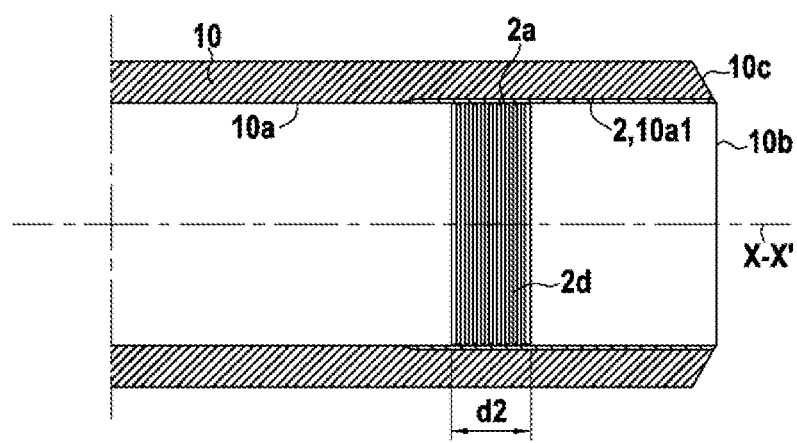

In FIG. 1C, this weld overlay 2 has then been machined to the nominal inner diameter D1 of the pipe in its current part. Shown in FIG. 1C is the creation on the pressure side of the anti-corrosion weld overlay 2 of a corrugation on the first part 2*a* of the overlay layer 2 in proximity to the chamfer 10*a*2, consisting of a plurality of parallel circular peripheral grooves 2*d*, with a depth of 1 to 1.5 mm extending over a length d2 of ⅕ to ½ of L1, preferably of ¼ to ⅓ of L1, for example approximately 75 mm if L1=D1=210 mm and with a distance between the circular grooves of 4 to 6 mm.

In FIG. 1C, finish machining has also been carried out of the end 10 of the pipe element 10 and of the corresponding end of the overlay layer 2 so as to form a portion of the chamfer 10*c* for the deposition of a weld bead intended for the end-to-end assembly of two pipe elements 10-1, 10-2.

Figure 1D:
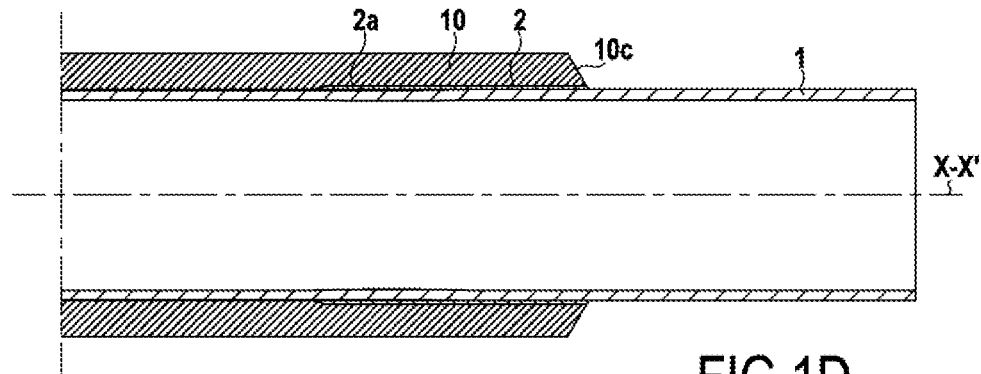

In FIG. 1D, a lining in the form of a coating of flexible plastic material 1 called a "liner" is then carried out, preferably of high-density polyethylene or a polymer material compatible with the fluid to be transported. To accomplish this continuously according to the method called swagelining, an internal tubular shell is then inserted into the pipe 10 then released to be pressed or bonded against the internal wall.

Figure 1E:
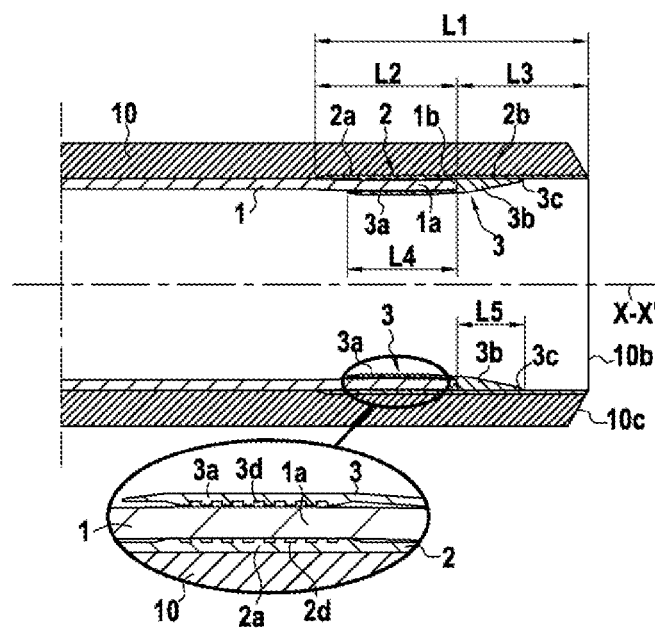

Then, as shown in FIG. 1E, after the required delay, said tubular shell of the liner 1 is cut at the specified location 1*b* on the overlay layer 2, the end not lined by the liner 1 extends over a length L3 from the end 10*b* of the pipe element to be welded by approximately at least half of L1. Thus, only a first part 2*a* of the layer of length L2 comprising the corrugation of the layer 2 of corrosion-resistant alloy is covered by said protective coating of plastic material 1, a second terminal part 2*b* of length L3 substantially equal to L2 of the layer 2 of corrosion-resistant alloy is not covered by said protective coating of plastic material (1).

In FIG. 1E, a ring 3 of corrosion-resisting steel alloy, including:
(a) a first annular part 3*a*, the pressure side face of which is in part corrugated with a plurality of parallel circular peripheral grooves 3*d*, over a length d3, here substantially identical to d2, the part 3*a* being able to be inserted and to cover a terminal part 1*a* of the lining 1 of high-density polyethylene, over a length L4, in line with the part of the overlay 2 the pressure side face of which is provided with grooves 2*a*, L4 being less than L3, and
(b) a conical shape 3*b* continuing the first part 3*a*, which is able to be inserted, then welded on the internal wall of the pipe element coated with only the overlay 2, extending from and against the end 1*b* of the plastic lining 1 over a length L5 of approximately ½ of L3 until its end 3*c* closest to the end 10*b* of the pipe element 10.

Figure 1F:
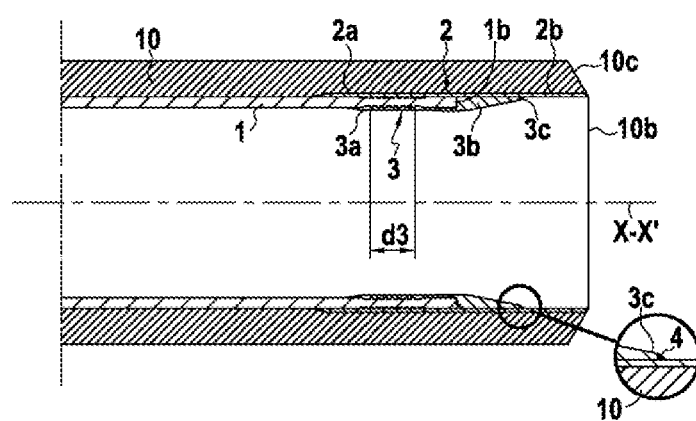

In FIG. 1F, a sleeve or other expandable or deformable tool, inflatable in particular (not shown) inserted in the pipe element, has allowed accomplishing under pressure the crimping of the corrugated part of the first part 3*a* of the ring 3 and the corrugated part of the first part 2*a* of the layer 2 of anti-corrosion steel alloy by plastic deformation against the part 1*a* of the lining 1 of high-density polyethylene. The crimping of the compression ring 3 combined with the corrugated sectors 2*a*, 3*a*, contribute to protect the terminal part 1*a* of the liner 1 during subsequent welding 11 and the sealing of the steel liner-wall connection 10*a*. In FIG. 1F, the end 3*c* of the cone 3*b* is welded by a weld of anti-corrosion steel alloy 4 so as to enhance the sealing and avoid corrosive liquid being able to penetrate under the ring 3.

Figure 2:
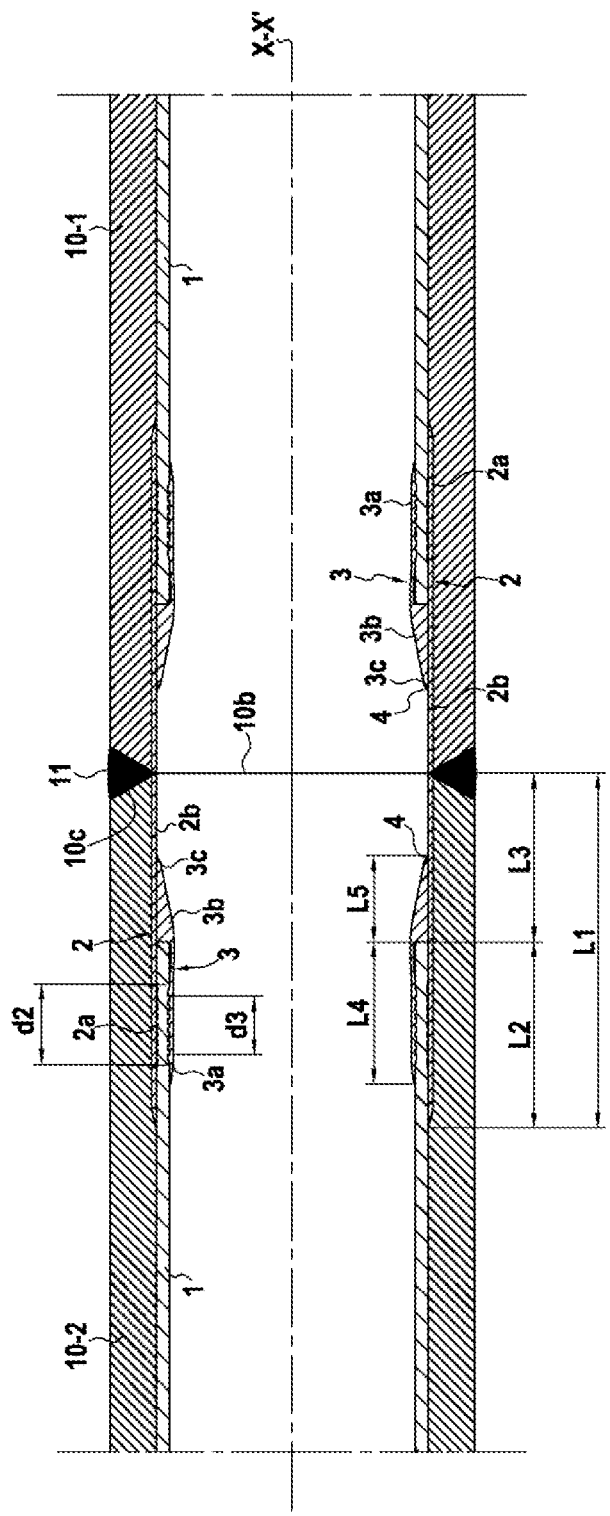
FIG. 2 illustrates the assembly by welding of two pipe elements set end to end for implementation of the method according to the invention.

In FIG. 2, the two ends 10*b* of the two pipe elements 10-1 and 10-2 thus lined are then welded end to end by a peripheral weld 11 accomplished by a method of corrosion-resistant steel alloy welding at the chamfers 10*c*.

Figure 3:
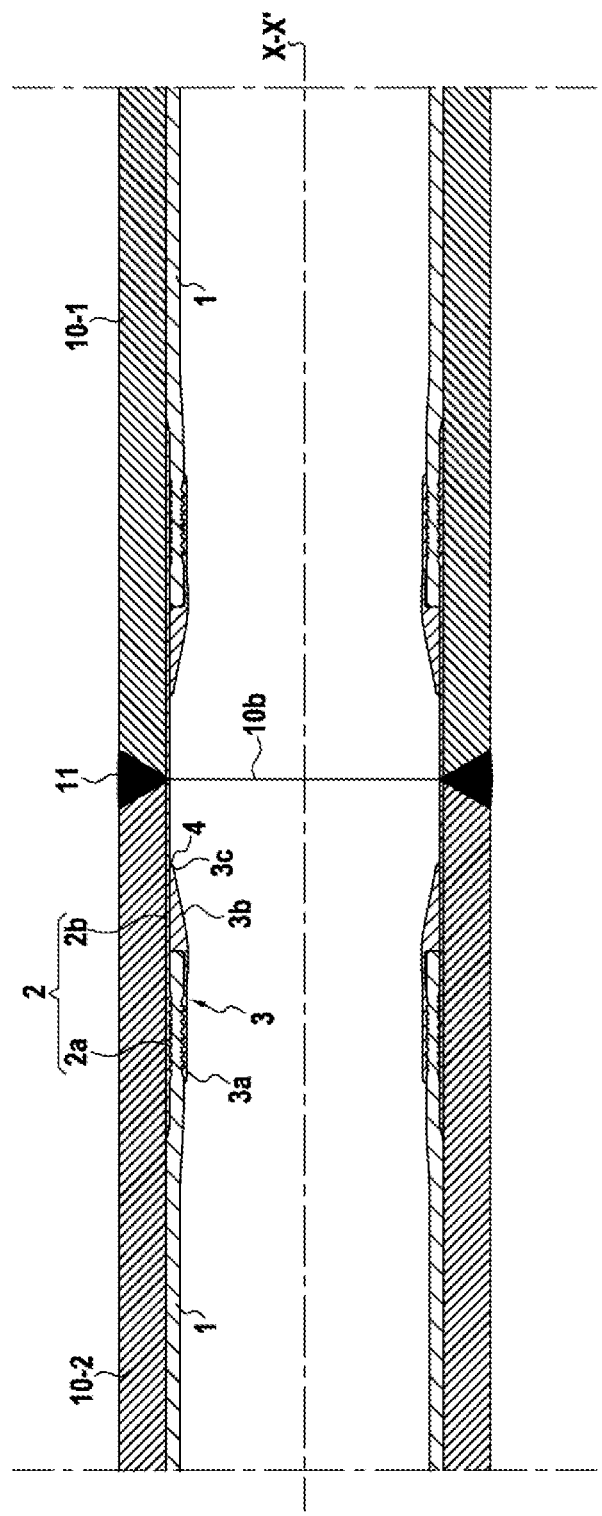
FIG. 3 is a variant embodiment of a pipe element lined on the non-machined internal wall of a pipe element 10.

In FIG. 3, is shown a non-preferred variant in which the internal wall 10*a* of the pipe element 10, 10-1, 10-2 is not machined prior to the deposition of the overlay 2 forming a coating of anti-corrosion steel alloy 2 which creates a shoulder 2*b* with a thickness corresponding to the thickness of 3 mm of the overlay 2 relative to the nominal inner diameter of the pipe.

The method according to the invention applies to the lining of any steel pipe intended for the transport of fluids, particularly to underwater pipes, resting on the bottom of the ocean or providing the bottom-to-surface connection for the transfer of hydrocarbons, for example petroleum or gas, originating in underwater production wells.

Preferably, the overlay layer of anti-corrosion steel alloy 2 and the compression ring 3 are made of Inconel 625®, i.e. of a Ni 61/Cr 22/Mo 9/Fe 5 alloy. A stainless steel alloy of this type is particularly known for its great strength and its corrosion resistance properties.

The overlay layer 2 can advantageously be deposited by welding in several layers as described in patent application FR 1752255 in the applicant's name.

In certain cases, it can happen that it is necessary to carry out a connection to an existing pipe at the bottom of the ocean, including a terminal pipe element 10-3 not equipped with a said compression ring and layer of corrosion-resistant steel alloy and in which it is difficult to directly crimp a compression ring of this type according to the invention *in situ* in its terminal part or even in the case of cutting into the pipe while it is being laid at an unexpected location. In a case of this type, as shown in FIGS. 4A-4B, it is possible to add, to the pipe element 10-3 at the bottom of the ocean, a hybrid pipe element 10-2 according to the invention equipped (a) with a tubular junction sleeve 5 protruding by L0 outside one end 10*d* of the hybrid pipe element 10-2 intended to be assembled to said terminal pipe element 10-3 at the bottom of the ocean and (b) a compression ring 3 and layer of corrosion-resistant steel alloy according to the invention at its other end 10*c* intended to be assembled to a pipe element 10-1 equipped with a compression ring and layer of corrosion resistant steel alloy according to the invention. The other end 5*a* of the tubular junction sleeve 5 inside the hybrid pipe element 10-2 can be beveled or chamfered and thus assembled in known fashion (for example by electric socket welding as described in FR 2 963 654) to a beveled or chamfered end of complementary shape 1*c* abutting the plastic lining 1 of the hybrid pipe element 10-2 on the side opposite to the compression ring. For example, the ends 5*a* and 5*b* of conical shape of the sleeve 5 are each provided with a spiral wire 8 wound over the conical surface 5*a*, 5*b* so that, when supplied with an electrical current at 8*a*, electric socket welding of said ends 5*a*, 5*b* can be carried out against the complementary ends in abutment 1*c* and 1'*a* of the plastic linings of the pipe elements 10-2 and 10-3 respectively.

To accomplish this, the following steps are performed:

stripping the plastic lining 1' from the terminal end of the pipe element 10-3 of the lined pipe at the bottom of the ocean over the appropriate length L0, preparation of the welding chamfer 1'*a* of the end of the plastic lining able to be assembled for example by electric socket welding or other with the end of a tubular junction sleeve, setting the diameter of the steel terminal pipe element 10-3 if necessary, and terminal chamfering 10*e*, insertion of the exterior chamfered end 5*b* of the plastic tubular junction element 5 of the hybrid pipe element 10-2 in the end of the pipe element 10-3 until it comes into abutment on the chamfer 1'*a* to be welded by electric socket welding of the plastic lining 1' of the pipe element 10-3, the sleeve 5 protruding by L0 from the end 10*d* of the hybrid element 10-2 so that the end 10*d* of the hybrid element 10-2 arrives in abutment or in proximity to the end 10*e* of the pipe element 10-3 to allow their welding with steel alloy 11', and assembly, preferably by electric socket welding, of the chamfer 5*b* of the plastic sleeve of the hybrid element 10-2 to that 1'*a* of the plastic lining 1' of the pipe element 10-3, and welding in steel alloy 11' of the end 10*d* of the hybrid element 10-2 with the end 10*e* of the pipe element 10-3 equipped with the screen 6 by means of the welding device 7. This screen 6 of ceramics limits the transfer of heat and protects the thermoplastic sleeve through the entire duration of the welding process.

Figure 4C:
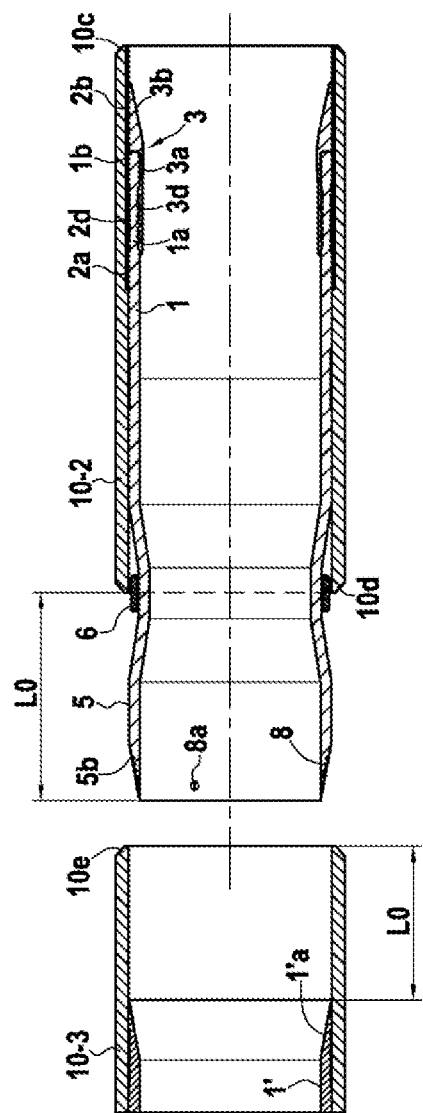

Shown in FIG. 4C, is a preferred embodiment in which, in the hybrid pipe element 10-2, the sleeve 5 is formed in a continuous piece with the plastic coating 1, hence there is no welding by electric socket welding to be performed at the junction of the ends 5*a*/1*c* inside the hybrid pipe element 10-2 as in FIG. 4A.

The invention claimed is:

1. A pipe element comprising:
    a layer of corrosion-resistant steel alloy on a terminal part of length L1 of an internal wall of said pipe element from a first to be welded;
    a protective coating of plastic material applied directly on the internal wall of said pipe element; and covering a first part of length L2 of said layer of corrosion-resistant steel alloy, a second part of length L3 of said layer of corrosion-resistant steel alloy on a side of said first end to be welded of said pipe element not being covered by said protective coating of plastic material,
    a compression ring of corrosion-resistant steel alloy inserted inside the pipe element comprising:
        (a) a first annular part of length L4 comprising an outer side face which is corrugated, over a part at least of its length L4, said first annular part being crimped against a pressure side face of at least one terminal part of said protective coating of plastic material covering said first part of said layer of corrosion-resistant steel alloy, and
        (b) a second annular part of length L5 less than L3, continuing said first annular part, applied against a part of said second part of the layer of corrosion-resistant steel alloy not covered by said coating of plastic material, said second annular part of said compression ring extending from and against an end of said coating of plastic material until a free end of said compression ring closest to the first end to be welded of the pipe element, welded against said second part of said layer of corrosion-resistant steel alloy not covered by said protective coating of plastic material.

2. The pipe element according to claim 1, wherein,
    a first part of the pressure side face of the layer of corrosion-resistant steel alloy intended to be covered by a terminal part of said protective coating of plastic material is machined for corrugation, in part at least, and
    said compression ring comprises at least:
        (a) one first annular part, the outer side face of which is corrugated in part at least, able to cover said terminal part of said protective coating of plastic material, in line with at least the corrugated part of the first part of the layer of corrosion-resistant steel alloy of which the pressure side face is covered by the terminal part of said protective coating of plastic material, said first annular part extending in line with the second part of the layer of corrosion-resistant steel alloy not covered by said coating of plastic material, and
        (b) one said second annular part the pressure side surface of which is of conical shape connecting the pressure side surface of the first annular part and the surface of the second part of the layer of corrosion-resistant steel alloy not covered by said coating of plastic material, at the end of said second annular part of the compression ring welded against said second part of said layer of corrosion-resistant steel alloy not covered by said protective coating of plastic material.

3. The pipe element according to claim 1, wherein a second end of said pipe element is arranged not to be welded and is provided without said compression ring, the second end comprises a rigid tubular junction sleeve of thermoplastic material, a first longitudinal end of said sleeve being in sealed contact or being formed in a continuous piece with the other end of said coating of plastic material inside said pipe element, a second end of said sleeve protruding by a length L0 outside the other end of said pipe element.

4. The pipe element according to claim 3, wherein said second end of said sleeve protruding outside the second end of said pipe element is inserted inside another pipe element in sealed contact, with the end of a coating of plastic material set back by a length L0 inside said other pipe element relative to the end of said other pipe element assembled by steel alloy welding with said pipe element.

5. A pipe element that is able to carry corrosive fluids, an internal wall of which is partially lined by a protective coating of plastic material of a liner type wherein an assembly by welding directly together ends of at least two pipe elements is provided for, wherein a method for making the pipe element comprises successive steps:
    a) applying a layer of corrosion-resistant steel alloy on a terminal part of length L1 of the internal wall of each pipe element from a first end to be welded;
    b) machining on the pressure side surface of the layer of corrosion-resistant steel alloy,
    c) applying a protective coating of plastic material directly on the internal wall of each pipe element; and covering a first part of length L2 of said layer of corrosion-resistant steel alloy, a second, adjacent part of length L3 of said layer of corrosion-resistant steel alloy on a side of the first end to be welded of each pipe element not being covered by said protective coating of plastic material, d) coaxially inserting of a compression ring of corrosion-resistant steel alloy inside said terminal part of each pipe element and the crimping of a first annular part of length L4 of said compression ring against the pressure side face of the terminal part of said protective coating of plastic material covering a first part of said layer of corrosion-resistant steel alloy, and the welding of a free end of a second annular part of said compression ring against a second part of said layer of corrosion-resistant steel alloy not covered by said protective coating of plastic material, said first annular part of the compression ring comprising an outer side face which is corrugated, over a part at least of its length said second annular part of said compression ring continuing said first annular part, said second annular part being applied against a part of said second part of the layer of corrosion-resistant steel alloy not covered by said coating of plastic material and extending over a length L5 less than L3, from and against the end of said coating of plastic material until said free end of said compression ring closest to the first end to be welded of the pipe element, and e) assembling by welding directly together the ends to be welded of two pipe elements by a corrosion-resistant steel alloy weld;

wherein, before step e), finish machining is also carried out of the end of the pipe to form a chamfer allowing receiving a weld bead during step e) of end-to-end assembly by welding;

wherein the pipe element obtained in step 1) and useful in step 2) comprises:

a layer of corrosion-resistant steel alloy on a terminal part of length L1 of the internal wall of said pipe element from the first end to be welded;

a protective coating of plastic material applied directly on the internal wall of said pipe element; and covering a first part of length L2 of said layer of corrosion-resistant steel alloy, a second part of length L3 of said layer of corrosion-resistant steel alloy on the side of said first end to be welded of said pipe element not being covered by said protective coating of plastic material, a compression ring of corrosion-resistant steel alloy inserted inside the pipe element comprising:

(i) a first annular part of length L4 comprising an outer side face which is corrugated, over a part at least of its length L4, said first annular part being crimped against the pressure side face of at least one terminal part of said protective coating of plastic material covering said first part of said layer of corrosion-resistant steel alloy, and (ii) a second annular part of length L5 less than L3, continuing said first annular part, applied against a part of said second part of the layer of corrosion-resistant steel alloy not covered by said coating of plastic material, said second annular part of said compression ring extending from and against the end of said coating of plastic material until said free end of said compression ring closest to the end to be welded of the pipe element, welded against said second part of said layer of corrosion-resistant steel alloy not covered by said protective coating of plastic material;

wherein a second end of said pipe element is arranged not to be welded and is provided without said compression ring, the second end comprises a rigid tubular junction sleeve of thermoplastic material, a first longitudinal end of said sleeve being in sealed contact or being formed in a continuous piece with the other end of said coating of plastic material inside said pipe element, a second end of said sleeve protruding by a length L0 outside the other end of said pipe element.

6. A pipe element according to claim 5, wherein said second end of said sleeve protruding outside the second end of said pipe element is inserted inside another pipe element in sealed contact, with the end of a coating of plastic material set back by a length L0 inside said other pipe element relative to the end of said other pipe element assembled by steel alloy welding with said pipe element.

* * * * *